United States Patent
Van Savage et al.

(10) Patent No.: US 7,756,038 B2
(45) Date of Patent: Jul. 13, 2010

(54) SERVICE ADVERTISEMENT FRAMEWORK (SAF) IN A COMMUNICATIONS NETWORK

(75) Inventors: Donnie Van Savage, Raleigh, NC (US); Timothy Charles Schuler, Erie, CO (US); Graham Gudgin, San Jose, CA (US); Stefano Giorcelli, Valbonne (FR); Gregory Edwards, Mogadore, OH (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 11/863,218

(22) Filed: Sep. 27, 2007

(65) Prior Publication Data

US 2009/0086726 A1    Apr. 2, 2009

(51) Int. Cl.
*H04L 12/26* (2006.01)
(52) U.S. Cl. .................. 370/235; 370/230; 370/252
(58) Field of Classification Search .......... 370/235, 370/237, 238, 238.1, 230, 230.1, 231, 400, 370/401, 410, 352, 356
See application file for complete search history.

(56) References Cited

U.S. PATENT DOCUMENTS

| | | | | | |
|---|---|---|---|---|---|
| 5,687,168 | A  * | 11/1997 | Iwata | ................... | 370/255 |
| 6,044,075 | A  * |  3/2000 | Le Boudec et al. | ......... | 370/351 |
| 6,633,544 | B1 * | 10/2003 | Rexford et al. | ............. | 370/238 |
| 6,658,479 | B1 * | 12/2003 | Zaumen et al. | ............. | 709/238 |
| 6,831,895 | B1 * | 12/2004 | Ji et al. | ................... | 370/237 |
| 7,002,917 | B1 * |  2/2006 | Saleh | ................... | 370/238 |
| 7,280,481 | B2 * | 10/2007 | Rong | ................... | 370/238 |
| 7,324,439 | B2 * |  1/2008 | Loo | ..................... | 370/217 |
| 7,535,874 | B2 * |  5/2009 | Ozluturk et al. | ............. | 370/335 |
| 2003/0095504 | A1 * |  5/2003 | Ogier | ...................... | 370/235 |
| 2003/0161268 | A1 * |  8/2003 | Larsson et al. | ............. | 370/229 |
| 2003/0179707 | A1 * |  9/2003 | Bare | ...................... | 370/235 |
| 2004/0218529 | A1 * | 11/2004 | Rodosek et al. | ............. | 370/235 |
| 2006/0077900 | A1 * |  4/2006 | Carello et al. | ............... | 370/238 |
| 2006/0250961 | A1 * | 11/2006 | Vasseur | ................... | 370/235 |
| 2007/0058568 | A1 * |  3/2007 | Previdi et al. | ............... | 370/254 |
| 2007/0286082 | A1 * | 12/2007 | Hikspoors et al. | ........... | 370/238 |
| 2008/0279101 | A1 * | 11/2008 | Wu et al. | ................... | 370/235 |
| 2009/0067330 | A1 * |  3/2009 | Shand et al. | ................ | 370/235 |

OTHER PUBLICATIONS

J. Rosenberg et al., Telephony Routing over IP (TRIP), http://www.ietf.org/rfc/rfc3219.txt, Jan. 1, 2002, p. 79, Publisher: Internet Engineering Task force, Published in: Internet.

* cited by examiner

*Primary Examiner*—Chi H. Pham
*Assistant Examiner*—Kevin Mew
(74) *Attorney, Agent, or Firm*—Brinks Hofer Gilson & Lione

(57) ABSTRACT

In one embodiment, a method includes receiving a first update message at a first forwarding node from a second forwarding node of the communications network. The first update message includes forwarded service type data that indicates a type of service available via the second forwarding node, and forwarded cost data that indicates a first cost of communications to obtain the type of service via the second forwarding node. An incremental cost is determined for communications between the first forwarding node and the second forwarding node. Service data is stored at the first forwarding node. The service data indicates the type of service is associated with the second forwarding node at a total cost based on the first cost and the incremental cost. A second update message that includes forwarded cost data based on the total cost is sent over the network from the first forwarding node.

25 Claims, 8 Drawing Sheets

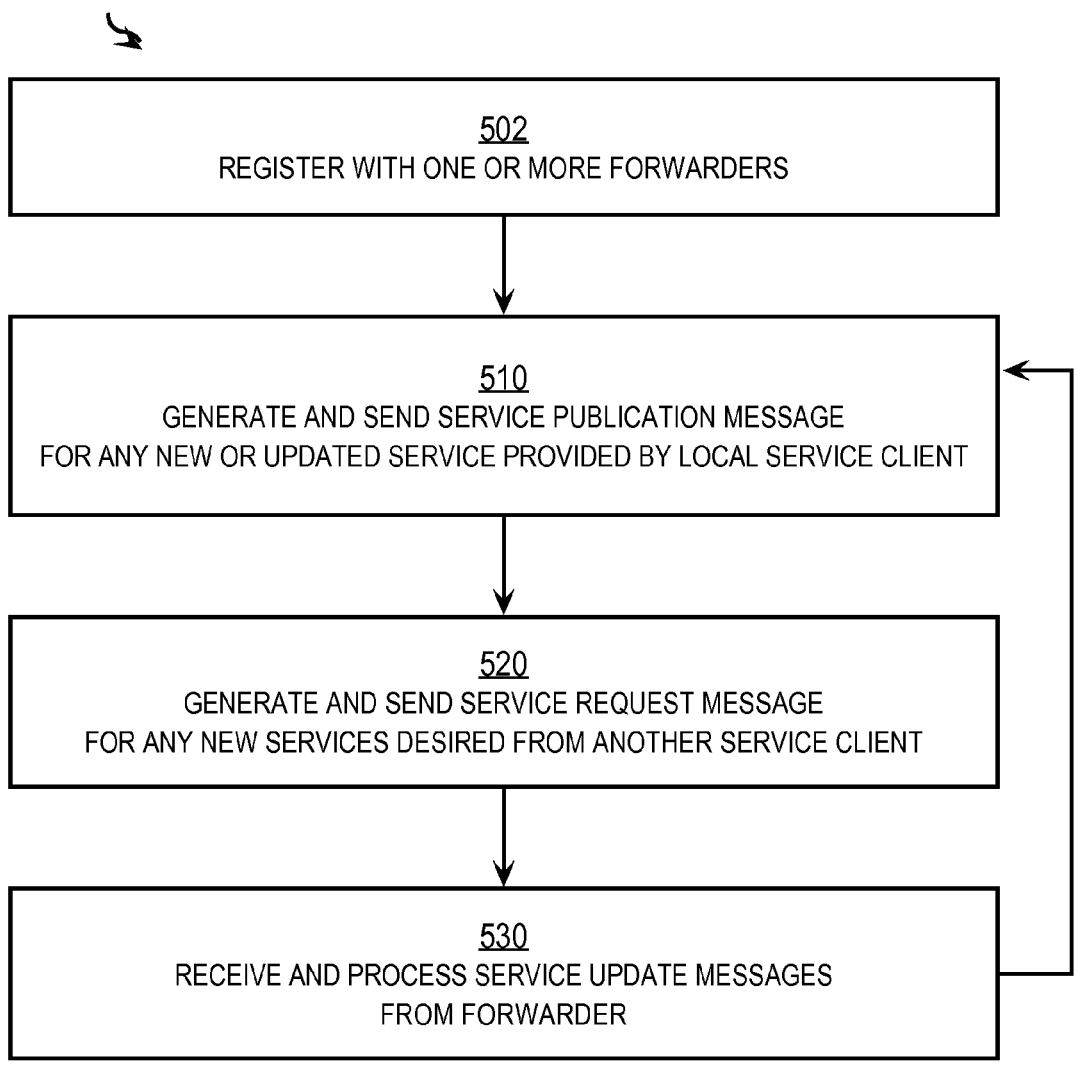

SERVICE ADVERTISEMENT FRAMEWORK (SAF) IN A COMMUNICATIONS NETWORK

BACKGROUND OF THE INVENTION

1. Field of the Invention

The present invention relates to propagating updates for services available at end nodes of a communications network.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links.

To set up a telephone call using an Internet Protocol (IP) over a communications network, a dial number (DN, also called a directory number) must be converted to an IP address of an end node serving as an IP telephone. The conversion of a DN to an IP address is a service performed at a call agent, a process that executes on one or more nodes of a network. Call agents also perform other functions to support telephony over an IP network, such as ringing the called end node, call forwarding, conference calls, voice mail, and other functions already known or still under development. A call agent must be re-configured as dial numbers and other features change. Currently, all call agents must be re-configured with manual human input when such changes occur even at only one of them.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 illustrates an example method at a service client node; and

DESCRIPTION OF EXAMPLE EMBODIMENTS

Figure 1A:
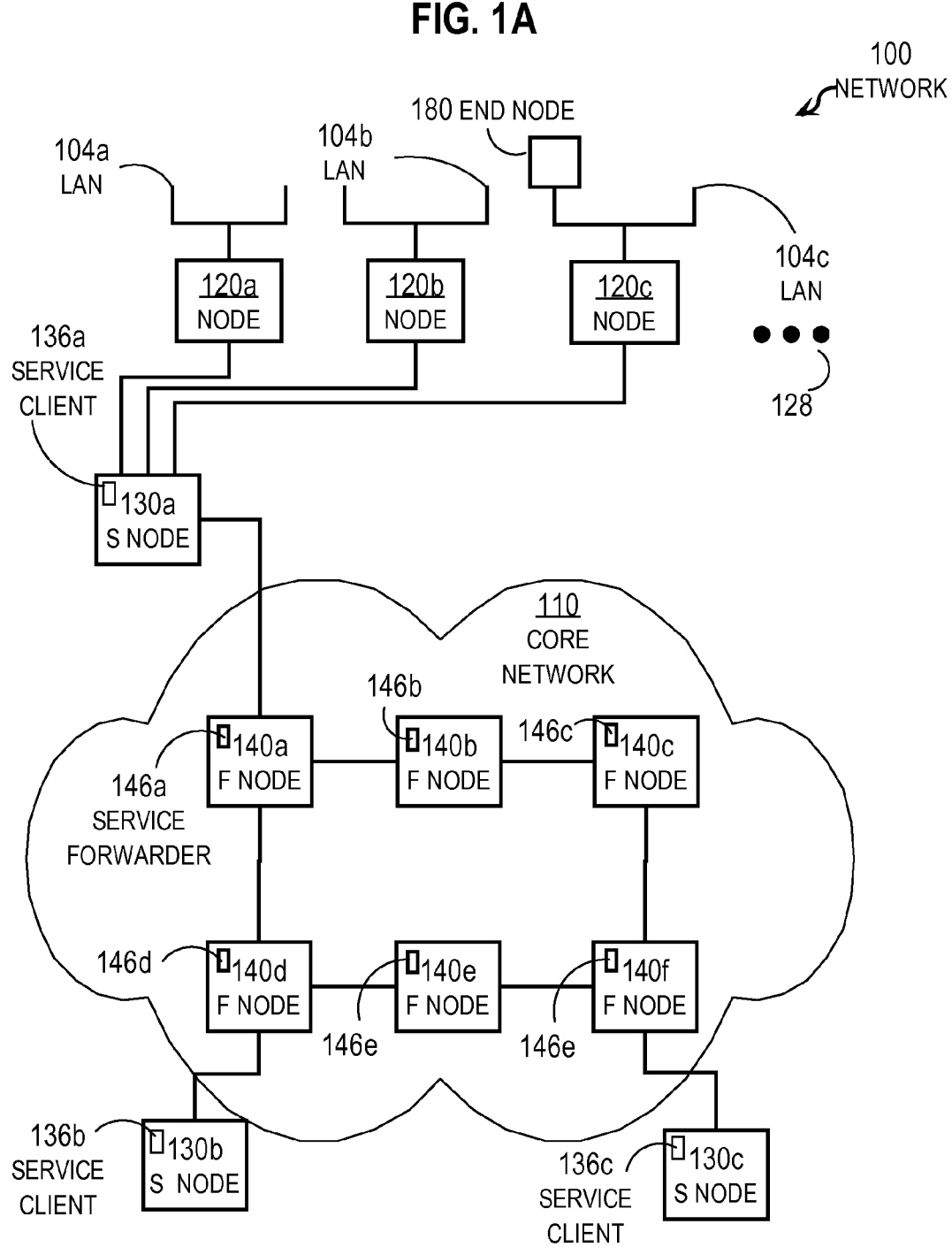
FIG. 1A illustrates an example network with service forwarding nodes to propagate advertisements of available services, such as call agent services.

Techniques are described for a service advertisement framework (SAF) for forwarding service advertisements in a communications network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described in the context of adjacent routers acting as service advertisement forwarding nodes to advertise call agent services and service changes. However, the invention is not limited to this context, and in other embodiments, other intermediate or end nodes communicate among each other over direct links or indirect links over a transparent core network to serve as service advertisement forwarding nodes for one or more different services that each involve service nodes that provide the service or consume the service or both.

1.0 Overview

In one set of embodiments, a method includes receiving a first update message at a first forwarding node of a communications network from a second forwarding node of the communications network. The first update message includes forwarded service type data that indicates a type of service available via the second forwarding node, and forwarded cost data that indicates a first cost of communications to obtain the type of service via the second forwarding node. The type of service is different from data packet routing through the network. An incremental cost is determined for communications between the first forwarding node and the second forwarding node. Service data is stored at the first forwarding node. The service data indicates the type of service is associated with the second forwarding node at a total cost based on the first cost and the incremental cost. A second update message that includes forwarded cost data based on the total cost is sent over the network from the first forwarding node.

In other embodiments, an apparatus, or logic encoded in one or more tangible media, or instructions encoded on one or more computer-readable media are configured to perform one or more steps of the above method.

2.0 Network Overview

When a telephone-enabled end node attempts to initiate a call, it contacts a call agent (e.g., CA1) associated with that end node and requests a connection to a called dial number (DN). If CA1 does not control devices associated with the called DN, it then determines which call agent (e.g., CA2) is associated with the called DN and sends a request to CA2 for setting up a call. CA2 responds to CA1 with the IP address of the device associated with the DN of the called party. CA1 and CA2 then negotiate a calling session, e.g., using the Session Initiation Protocol (SIP). When the parameters of the call are set up, CA1 passes the IP address of the device associated with the called party to the calling end node; CA2 rings the called end node and passes the IP address of the calling end node to the called end node. The two end nodes then exchange IP data packets with voice data.

Frequently, multiple call agents manage all the dial numbers for an enterprise. Currently, each call agent is configured statically with dial numbers or ranges of dial numbers and corresponding IP addresses for each end node controlled by that call agent. One or more attributes of the end node serving as an IP telephone are also configured at the call agent for each end node controlled by that call agent. In order to communicate, these call agents need to know "who owns" certain ranges of DN's, so that they must be configured with static "routes", either directly to each other, or to a central "route server" (sometimes known as a gatekeeper), which is configured with all the DN ranges and the call agents that 'own' them. When a new call agent is added to the network, or a new DN range is added or changed within a call agent, all other call agents, or all the "route servers" need to be updated with this information Currently, all call agents in a call cluster must be re-configured with input provided by a human when such changes occur.

Applicants have identified a need and a solution for changes at a call agent to automatically update all others call agents for the enterprise. Furthermore, Applicants have generalized the solution so that it works with any service provided among multiple nodes in a communication network. The generalized solution is called herein a service advertisement framework (SAF).

Each packet sent over a communication link typically comprises 1] header information associated with a particular protocol, and 2] payload information that follows the header information and contains information that may be processed independently of that particular protocol. The header includes information used by the protocol. Often, the data in the payload for the particular protocol includes a header and payload for a different protocol associated with a different layer of detail for information exchange.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Routers and switches are intermediate network nodes that determine which communication link or links to employ to support the progress of data packets through the network. An intermediate network node that determines which links to employ based on information in the internetwork header (layer 3) is called a router.

FIG. 1A illustrates an example network 100 with service forwarding nodes to propagate advertisements of available services, such as call agent services. Network 100 includes local area network (LAN) 104*a*, LAN 104*b*, LAN 104*c* (collectively referenced hereinafter as LAN 104) and a core network 110. Each LAN 140 includes one or more end nodes, such as end node 180 and others (not shown), connected to each other by communication links. Network 100 includes intermediate network node 120*b*, node 120*b*, node 120*c* and others indicated by ellipsis 128 (collectively referenced hereinafter as intermediate network nodes 120), and service node (S node) 130*a*, S node 130*b*, S node 130*c*, (collectively referenced hereinafter as service node 130). The core network 110 includes forwarding node (F node) 140*a*, F node 140*b*, F node 140*c*, F node 140*d*, F node 140*e* and F node 140*f* (collectively referenced hereinafter as forwarding nodes 140). Communication sessions are indicated by lines connecting nodes 120, service nodes 130 and forwarding nodes 140. In some embodiments, the communications sessions are over direct communication links, and in some embodiments one or more communication sessions are indirect communications through one or more intermediate network nodes (not shown) of core network 110. In some embodiments, one or more of forwarding nodes 140 and service nodes 130 are intermediate network nodes of core network 110, such as routers.

While a certain number of LANs 104, end nodes 180, intermediate network nodes 120, service nodes 130, and forwarders 140 are depicted in network 100 for purposes of illustration, in other embodiments, a network includes the same, fewer or more LANs, end nodes, intermediate network nodes, service nodes, and forwarding nodes.

According to the illustrated embodiment, service client process 136*a*, service client process 136*b* and service client process 136*c* (collectively referenced hereinafter as service clients 136) execute on service node 130*a*, service node 130*b* and service node 130*c*, respectively. Each service client 136 advertises the service offered on the respective service node or requests a service offered on another node, or both. Service forwarder process 146*a*, service forwarder process 146*b*, service forwarder process 146*c*, service forwarder process 146*d*, service forwarder process 146*e* and service forwarder process 146*f* (collectively referenced hereinafter as service forwarders 146) execute on forwarding node 140*a*, forwarding node 140*b*, forwarding node 140*c*, forwarding node 140*d*, forwarding node 140*e* and forwarding node 140*f*, respectively. Each service forwarder 146 forwards advertisements of new and updated services offered automatically to each other forwarder and to interested service clients 136. When a new service client requests the service, the forwarders automatically forward the request to the other available service clients. The service clients need not be configured and re-configured with the addresses of the other service nodes 130 and service properties. A service client need only be configured to communicate with one forwarder 146.

In some embodiments, a penultimate forwarder in communication with a service client maintains a copy of service properties being requested and can respond to a request, as described in more detail below.

In some embodiments, the same or different forwarders forward service advertisements and requests for multiple different related or unrelated services.

Figure 1B:
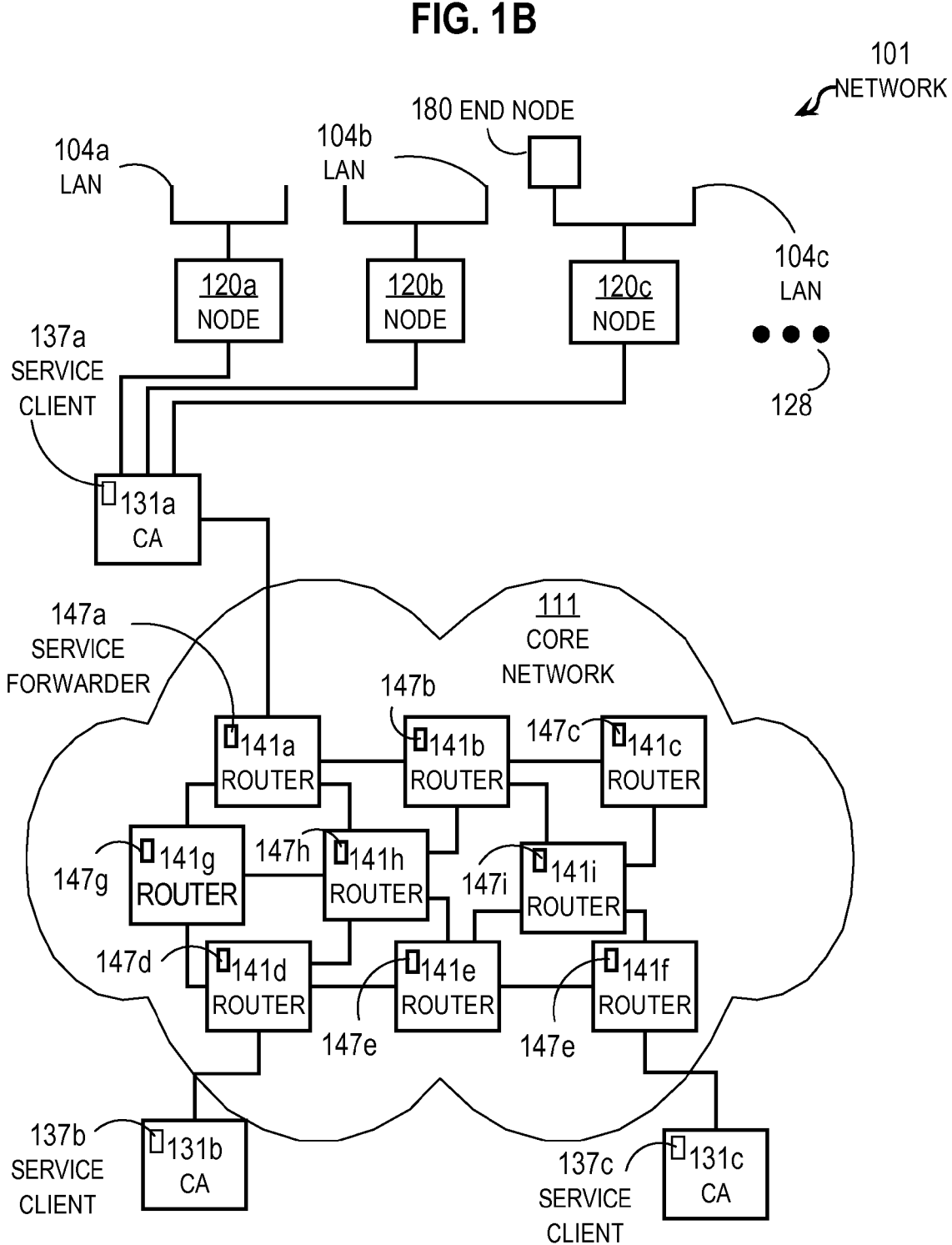
FIG. 1B illustrates an example network with adjacent routers performing as service forwarding nodes to propagate advertisements of call agent services.

FIG. 1B illustrates an example network 101 with adjacent routers performing as service forwarding nodes to propagate advertisements of call agent services. Network 101 includes LANs 104, end node 180 and intermediate network nodes 120, as described above in FIG. 1A. Network 101 includes call manger (CM) node 131*a*, call agent node 131*b* and call agent node 131*c*, (collectively referenced hereinafter as call agent nodes 131). Network 101 also includes a core network 111. The core network 111 includes router 141*a*, router 141*b*, router 141*c*, router 141*d*, router 141*e*, router 141*f*, router 141*g*, router 141*h* and router 141*i* (collectively referenced hereinafter as routers 141). Direct communication links are indicated by lines connecting nodes 120, call agent nodes 131 and routers 141.

While a certain number of LANs 104, end nodes 180, intermediate network nodes 120, call agent nodes 131, and routers 141 are depicted in network 101 for purposes of illustration, in other embodiments, a network includes the same, fewer or more LANs, end nodes, call agent nodes and routers.

According to the illustrated embodiment, service client process 137a, service client process 137b and service client process 137c (collectively referenced hereinafter as service clients 137) execute on call agent node 131a, call agent node 131b and call agent node 131c, respectively. Each service client 137 advertises the call agent service, such as a directory service to convert dial numbers (DN) to IP addresses, offered on the respective call agent node and requests the call agent service offered on another call agent node. Service forwarder 147a, service forwarder 147b, service process 147c, service forwarder 147d, service forwarder 147e and service forwarder 147i (collectively referenced hereinafter as forwarder 147) execute on router 141a, router 141b, router 141c, router 141d, router 141e, router 141f, router 141g, router 141h and router 14i, respectively. Each forwarder 147 forwards advertisements of new and updated call agent services automatically to each connected router and to call agent nodes 131 of interested service clients 137. When a new call agent node requests the call agent service, the routers either respond with the requested information or automatically forward the request to the other available call agent nodes. The call agent nodes and service clients 137 need not be configured and re-configured with the service properties or addresses of the other call agent nodes 131.

Thus, when a new dial number, e.g., 100-555-1707, is installed at call agent node 131a, e.g., for end node 180 with IP address 10.1.1.7, a directory service client 137a publishes the change to service forwarder 147a on router 141a. Router 147a propagates the change in a service update message that is sent to the directory service clients 137b and 137c on call agent nodes 131b and 131c, respectively, through one or more of its neighboring routers, router 141b, router 141g and router 141h. None of the call agent nodes need to be manually re-configured. The forwarders 147 are configured to avoid sending the updates in loops, as described in more detail below.

When a new call agent is to be added to the network, it need connect to only one forwarding node; although, for redundancy, it is practical to connect each call agent node to two or more forwarding nodes. For example, when call agent node 131c joins the network it is physically connected to router 141f. The call agent service client 131c then requests a call agent service, e.g., a directory service. The request is received by service forwarder process 147f, which already has received publication messages or update messages from the other two call agent nodes. Thus forwarder process 147f either already has the service information or knows to send the request to the service clients 137a and 137b on call agent nodes 131a and 131b, respectively.

To avoid excess traffic on core network 111, in some embodiments, the request that can not be answered locally is sent to the call agent nodes via a best path, as described in more detail below. For example, the request from service client 137c is sent to service client 137a via router 141f to router 141i to router 141b to router 141a. Similarly, the request from service client 137c is sent to service client 137b via router 141f to router 141e to router 141d. Thus routers 141c, 141g, 141h are not involved in responding to the request form service client 137c. Also, in some embodiments, the response to a request is sent along a best path from the providing node to the requesting node to conserve network resources. This allows the process to scale well to networks with large numbers of nodes.

Unlike existing methods, the call management data at call agent node is constantly and automatically updated with external routes and does not involve tedious and error-prone external route re-configuration of multiple call agent nodes by a human.

3.0 Service Advertisement Framework Data Structures

Figure 2A:
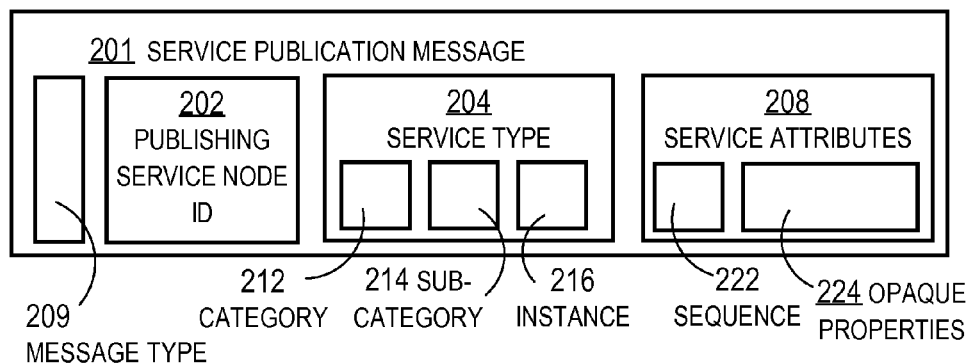
FIG. 2A illustrates an example service publication message received at a service forwarding node from a service providing node.

FIG. 2A illustrates an example service publication message 201 received at a service forwarder from a service client that provides the service. Message 201 includes a message type field 209, a publishing service node identifier (ID) field 202, a service type field 204 and service attributes field 208. Message 201 also includes other fields, not shown, including header fields for layer one and layer two and layer three protocols. In some embodiments, the message 201 includes a layer four header that includes a port identifier field that indicates a service client process executing on the service providing node, which sends the message 201.

The message type field 209 holds data that indicates the type of message. A particular value in the field 209 indicates the message is a service publication message. In some embodiments, the illustrated fields are in a single type-length-value (TLV) fields, well known in the art, in which leading digits indicate a type of field (e.g., a code indicating message type is a service publication message), the next digits indicate the length of the field, and the following digits hold the value or values associated with the type.

The publishing service node ID uniquely identifies a service providing node that provides a particular service that is advertised by the service publication message 201. In some embodiments, the publishing service node ID is an IP address for the publishing service node and the field 202 is the well known source IP address field of the IP header.

The service type field 204 holds data that uniquely indicates the type of service provided by the service providing node. In the illustrated embodiment, the service type field 204 includes a service category field 212, a service sub-category field 214 and a service instance field 216.

The category field 212 holds data that uniquely identifies a class of related services, such as unified communications to provide voice communications over IP. In the illustrated embodiment, the data in the service category field 212 is a code that is determined by some governing body, so that multiple different service categories can use the same service advertisement framework. It is assumed for purposes of illustration that the code with decimal value 100 indicates unified communications and that the value 200 indicates security services for dealing with suspicious data packets encountered on a network or encrypted data packets.

The sub-category field 214 holds data that distinguishes separate services within the service category. In the illustrated embodiment, the data in the service sub-category field 214 is a code that is determined by an owner of the service nodes. For example, an owner of service nodes for unified communications defines different service sub-category values for such services as dial number directory services, gateway services to the public switched telephone network (PSTN), call forwarding services, and conference call services. It is assumed for purposes of illustration that the code with decimal value 10 indicates dial number directory services, 20 indicates gateway services to PSTN, 30 indicates call forwarding services, and 40 indicates conference call services.

The service instance field 216 holds data that distinguishes among nodes that provide the same service category and service sub-category. For example, if service nodes 130a, 130b and 130c all provide category 100 and sub-category 10 services (unified communications—dial number directory services), they can be distinguished by values 1, 2 and 3, respectively, in the service instance field 216.

The service attributes field 204 holds data that provides information in support of the service. In the illustrated embodiment, the service attributes field 208 includes a sequence field 222, and opaque properties field 224.

The sequence field 222 holds data that distinguishes later version of the attributes field from earlier versions. In some embodiments, the content of the sequence field 222 is any value that fits and increases with later versions, such as a date time stamp.

The opaque properties field 224 holds data that indicates one or more properties of the service offered at the service node that issues the message 201. In many embodiments, the field 224 holds service configuration data that is presently input and changed manually on each service node to describe how to obtain a particular service on a different service node. For example, in a dial number directory service offered by call agent process on call agent node 131a, the opaque properties field 224 holds data that indicates the dial numbers of the end nodes on LAN 104 controlled by the service node (e.g., call agent node 131a) that issues the message 201 and the IP address and call protocol used by that service node.

Although fields are shown in FIG. 2A and subsequent diagrams of messages as continuous blocks of data in a particular order for purposes of illustrations, in other embodiments one or more fields or portions thereof occur in a different order, along with zero or more additional fields, not shown. The fields can be formed in any manner known in the art. In some embodiments, one or more of the fields are type-length-value (TLV) fields, described above.

Figure 2B:
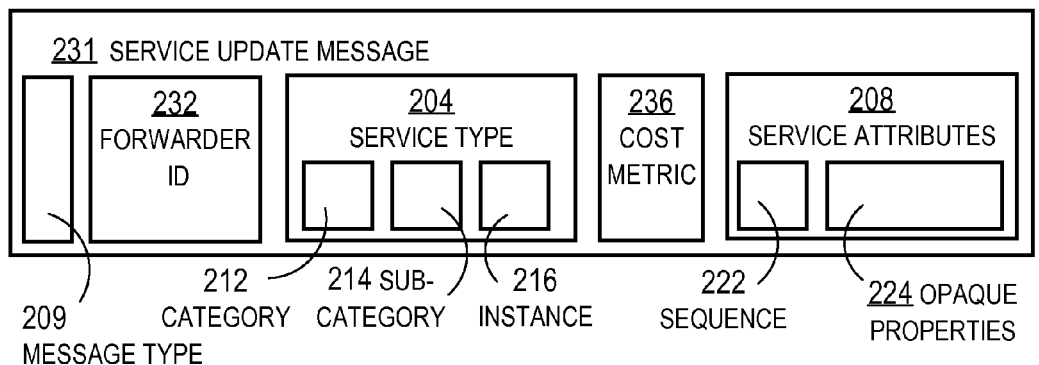
FIG. 2B illustrates an example service update message exchanged between service forwarding nodes.

FIG. 2B illustrates an example service update message 231 exchanged between service forwarders. Message 231 includes a message type field 209, a forwarder ID field 232, a service type field 204, a cost metric field 236 and service attributes field 208. Message 231 also includes other fields, not shown, including header fields for layer one and layer two and layer three protocols. In some embodiments, the message 231 includes a layer four header that includes a source port identifier field that indicates a forwarder sends the message 231 and a destination port identifier field that indicates a forwarder receives the message 231.

The message type field 209 is as described above, but holds data that indicates the message is a service update message.

The forwarder ID field 232 holds data that uniquely identifies a forwarder that sends the service update message 231. In some embodiments, the forwarder ID is an IP address for the forwarding node on which the forwarder executes and the field 232 is the well known source IP address field of the IP header.

The service type field 204 and service attributes field 208 are as described above; but in message 231, fields 204 and 208 refer to a service at a service node reachable through the forwarder identified in ID field 232.

The cost metric field 236 holds data that indicates the cost of reaching the service node that provides the service described in field 204 and field 208 through the forwarder identified in field 232. Any measure of cost may be used, such as cost metrics used by routers, as described in more detail in a later section. The cost metric is used by forwarders to determine which path of several available paths for the same service type for sending requests for the service type described in field 204.

Figure 2C:
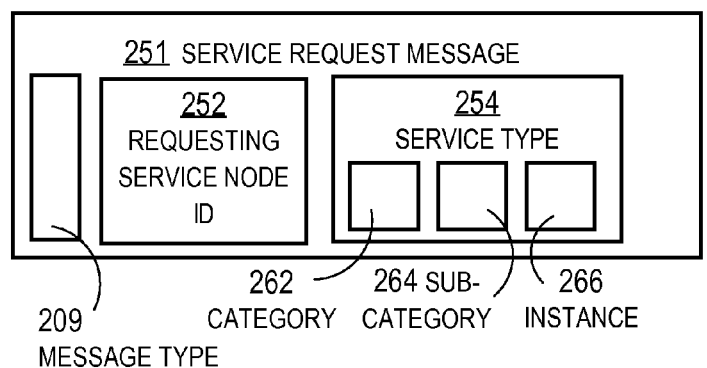
FIG. 2C illustrates an example service request message received at a service forwarding node from a service consuming node.

FIG. 2C illustrates an example service request message 251 received at a service forwarding node from a service consuming node. Message 251 includes a message type field 209, a requesting service node ID field 232 and a service type field 254. Message 251 also includes other fields, not shown, including header fields for layer one and layer two and layer three protocols. In some embodiments, the message 251 includes a layer four header that includes a source port identifier field that indicates a service client sends the message 251 and a destination port identifier field that indicates a forwarder receives the message 251.

The message type field 209 is as described above, but holds data that indicates the message is a service request message.

The requesting node ID field 252 holds data that uniquely identifiers a node that originated the service request message 251. The requesting node may be a service client or a forwarder. In some embodiments, the requesting node ID is an IP address for the requesting node. However the contents of field 252 do not change as the request is forwarded from one forwarder to another. In embodiments that do not use routers as the forwarders, the contents of the source IP address will be the IP address of the last forwarder that sent the request message and not necessarily the IP address of the service client that originated the request. In such embodiments, field 252 is not the source IP address field of the IP header.

The service type field 254 is similar to the service type field 204 described above. In the illustrated embodiment, field 254 includes a service category field 262, a service sub-category field 264 and a service instance field 266. Service type field 254 identifies the type of service to be consumed and is not likely to include a particular value for a service instance. The requesting service node should not know and should not care what instance of the service nodes 130 provides the service. In some embodiments, wildcard values are inserted into the service instance field 266 or the service sub-category field 264 or both to indicate any value in those fields satisfies the request. In some embodiments, the service type field omits the service instance field 266 or service sub-category field 264.

Figure 3:
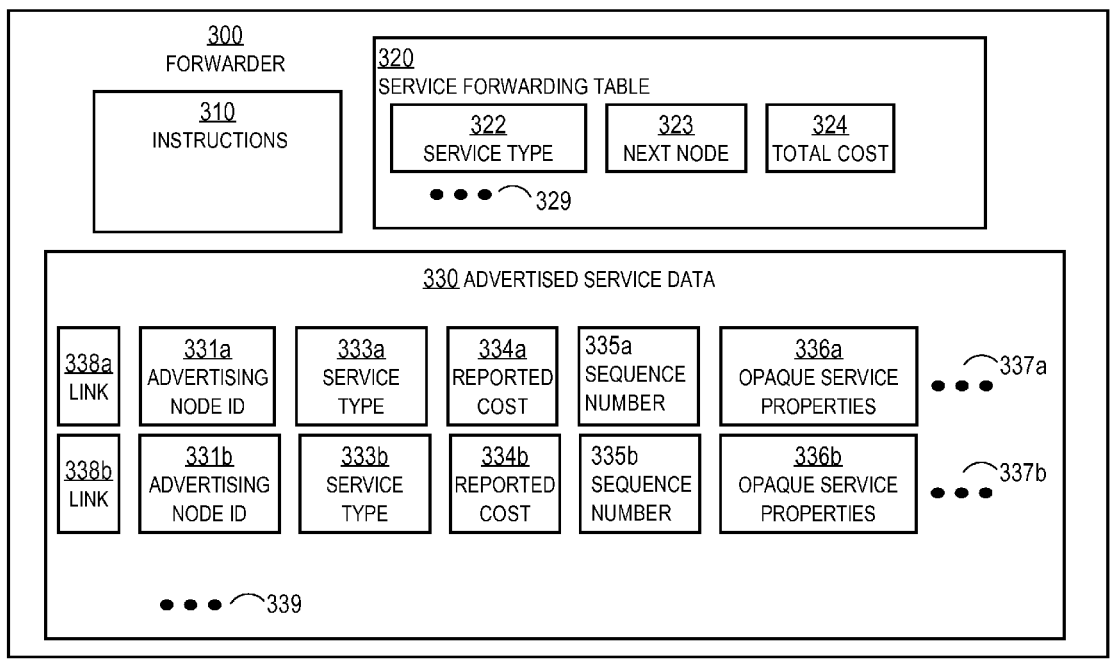
FIG. 3 illustrates example data structures on a service forwarding node for service data.

FIG. 3 illustrates example data structures for service data stored in a service forwarder 300 on a service forwarding node. Forwarder 300 includes instructions 310, a forwarding table 320, and advertised services data 330.

The instructions 310 are executed on one or more processors, such as a general purpose processor executing sequences of instructions that cause the processor to perform the service forwarder process. According to some embodiments of the invention, instructions implement a method described in more detail below with reference to FIG. 4A and FIG. 4B. The instructions 310 cause the one or more processors to store and retrieve information in the forwarding table 320 based on information received in one or more update messages that are stored in an advertised service data structure 330.

The forwarding table 320 is a data structure that includes for each service type that can be reached from the forwarder 300, a service type field 322, a next node field 323 and zero or more attribute fields. In the illustrated embodiment, the attributes fields include a total cost field 324. Fields for other service types in forwarding table 320 are indicated by ellipsis 329.

The service type field 322 holds data that indicates a service type, such as a service type indicated in field 204 in message 201. In some embodiments, the service type field 322 includes a service category field, a service sub-category field and a service instance field. In some embodiments one or both of the service sub-category field and the service instance field contains a wildcard value indicating a range of possible values or is omitted. The next node field 323 holds data that indicates a particular forwarding or service node in communication with forwarder 300 to which to send a request for service of a service type indicated by the data in field 322. In embodiments in which each router is a forwarder, the next node is a neighboring router or service node connected by a direct link. The total cost field 324 holds data that indicates total cost to reach the service node that provides the service type indicated in field 322.

The advertised service data structure 330 is a data structure that includes, for each service type received in a service update message, a link field (e.g., link fields 338a, 338b, collectively referenced hereinafter as link fields 338); an advertising node identifier (ID) field (e.g., advertising node ID fields 331a, 331b, collectively referenced hereinafter as advertising node ID fields 331); an advertised service type field (e.g., advertised service type fields 333a, 333b, collectively referenced hereinafter as service type fields 333); a reported cost field (e.g., reported cost fields 334a, 334b, collectively referenced hereinafter as reported cost fields 334); a sequence number field (e.g., sequence number fields 335a, 335b, collectively referenced hereinafter as sequence number fields 335) and an opaque service properties field (e.g., opaque service properties fields 336a, 336b, collectively referenced hereinafter as opaque service properties fields 336). Similar fields for other advertised service types from the same advertising node are indicated by ellipses 337a and 337b. Fields for other advertising nodes are indicated by ellipsis 339.

Link field 338 holds data that indicates a communication link interface on a router through which a service update message is received and a cost of using that link. In some embodiments in which the forwarder 300 is not a router, link field 338 includes a cost of a communications session with the node described in field 331.

Advertising node ID field 331 holds data that indicates uniquely the forwarding node or service client node that sent the service data recorded in the associated following fields. For example, field 331 holds data received in field 232 of an update message 231 or field 202 of a publication message 201. In some embodiments, the advertising node ID field 331 holds data that indicates the IP address of the advertising node.

The service type field 333 holds data that indicates a service type, such as a service type indicated in field 204 in publication message 201 or update message 231. In some embodiments, the service type field 333 includes a service category field, a service sub-category field and a service instance field. In some embodiments one or both of the service sub-category field and the service instance field contains a wildcard value indicating a range of possible values or is omitted.

The reported cost field 334 holds data that indicates a cost to reach the service indicated in service type field 333 reported by advertising node indicated in field 331, such as the data in cost metric field 236 in update message 231. The reported cost for a service type advertised in a publication message is taken to be zero.

The sequence number field 335 holds data that indicates a sequence number for the service data received from that advertising node, such as the data in field 222 of publication message 201 or update message 231.

The opaque service properties field 336 holds data that indicates opaque service properties received from that advertising node, such as the data in field 224 of publication message 201 or update message 231. In some embodiments, described in more detail below, the opaque service properties field 336 is omitted to save storage resources in forwarder 300.

Data structures depicted in FIG. 3 may be formed in any method known in the art, including using portions of volatile memory, or non-volatile storage on one or more nodes, in one or more files or in one or more databases accessed through a database server, or some combination. Although data structures 320, 330 are shown as integral blocks with contiguous fields, e.g. field 324, in a particular order for purposes of illustration, in other embodiments one or more portions of fields and data structures 320, 330 are stored in a different order or in different separate data structures on the same or different multiple nodes that perform the functions of forwarder 300. For example, in some embodiments the opaque service properties are stored in a different area of memory and a pointer to that portion of memory is stored in association with the other fields depicted in data structure 330.

Service forwarder 136 includes instructions 310 and one or more fields in forwarding table 320 and advertised service data structure 330.

3.0 Service Advertisement Framework Methods

Methods are described to provide a service advertisement framework (SAF) in a communications network. First a method at a forwarder is described. Then a cooperating method at a service client is described.

3.1 Method at Service Advertisement Forwarding Node

Figure 4A:
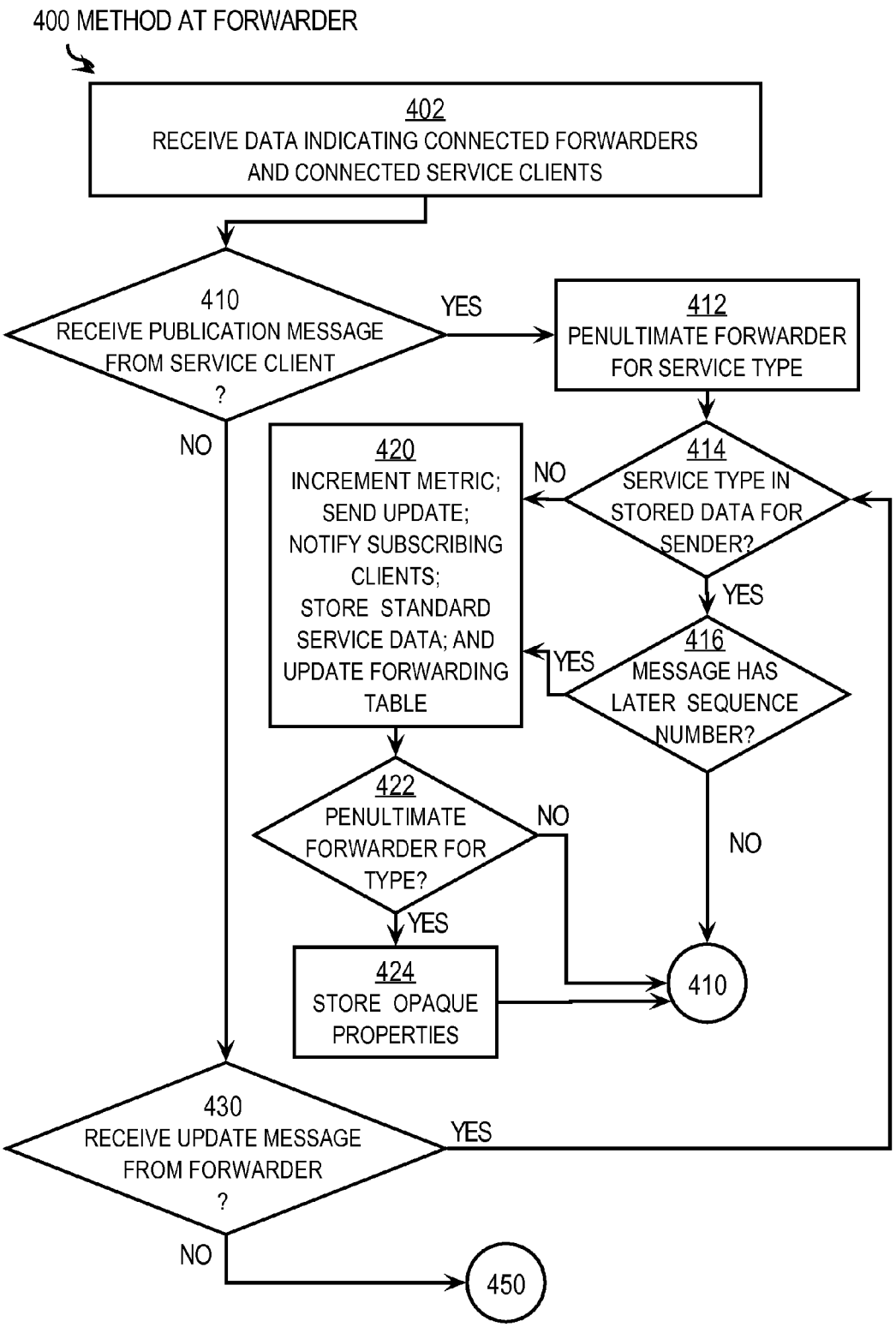
FIG. 4A and FIG. 4B illustrate an example method at a service forwarding node.
Figure 4B:
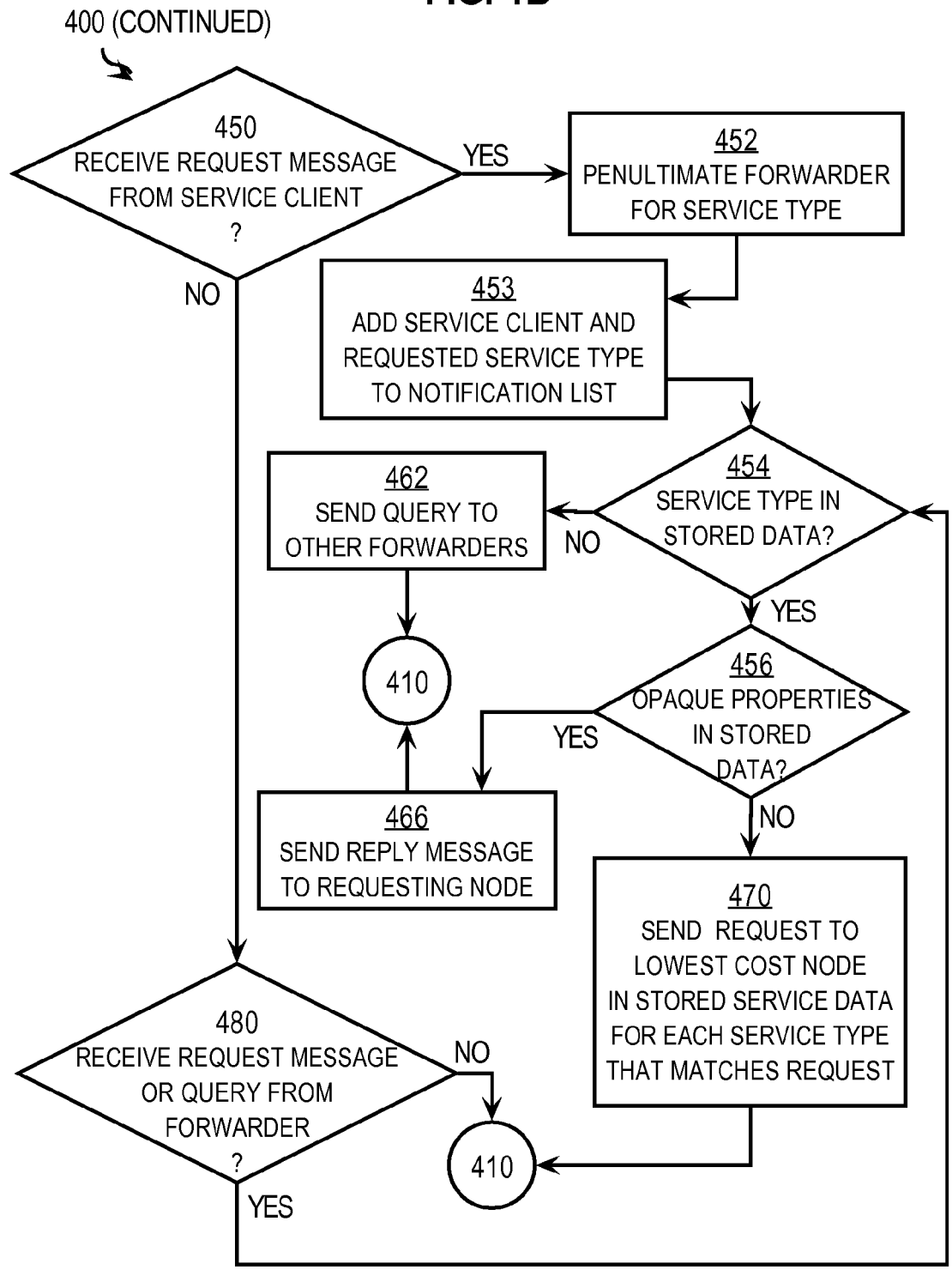

FIG. 4A and FIG. 4B illustrate an example method 400 at a service forwarding node. Although steps in FIG. 4A and FIG. 4B and subsequent flow chart, FIG. 5, are shown in a particular order for purposes of illustration, in other embodiments, one or more steps may be performed in a different order or overlapping in time, in series or in parallel, or one or more steps may be omitted or added, or changed in some combination of ways.

In step 402, data is received at a local forwarder, which indicates other forwarders and service clients with which the local forwarder communicates. For example, in some embodiments, the data indicates the IP addresses of every service client, if any, with which the local forwarder should communicate to deliver one or more service types. In some embodiments, the data indicates the IP address of each other forwarder with which the local forwarder communicates for one or more service types. In some embodiments, the data indicates an IP multicast group that includes the local forwarder and one or more or all other forwarders used for service advertisement for one or more service types. In some embodiments using routers as forwarders, the data indicates neighboring routers that have direct connections to the local router serving as the local forwarder, as is learned by a routing protocol that also executes on the router.

Any method may be used to receive this data. For example, in various embodiments, the data is included as a default value in software instructions, is received as manual input from a network administrator on the local or a remote node, is retrieved from a local file or database, or is sent from one or more different nodes on the network, either in response to a query or unsolicited, or the data is received using some combination of these methods. For example, in some embodiments, each service node or forwarding node that joins the SAF is manually configured with the IP address of at least one forwarder. The joining node then sends a registration message to the forwarder. The registration message holds data that indicates the joining node IP address. In some embodiments, the registration message also indicates whether the joining node is a forwarder or a service client node. In embodiments using routers, a routing protocol hello message on all links to discover neighbors suffices to provide the data received in step 402. An example of a routing protocol that provides an appropriate hello message is the Enhanced Internal Gateway Routing Protocol (EIGRP) of CISCO SYSTEMS, INC.™ of San Jose, Calif.

For purposes of illustration, it is assume that, during step 402, each forwarder learns of the service nodes and other forwarders shown connected in FIG. 1A. Thus, forwarder 146a learns the IP address of service node 130a, the IP address of forwarding node 140b and the IP address of forwarding node 140d. Similarly, forwarding node 140b receives data indicating the IP address of forwarding node 140a and forwarding node 140c, but not the IP address of any service node.

In step 410, it is determined whether the local forwarder receives a service publication message from a service client node. If so, control passes to step 412.

In step 412, it is determined that the local forwarder is a penultimate forwarder for the service type indicated in the service type field 204 of the publication message 201. According to some embodiments, a role of the penultimate forwarder is to store locally all information received about the service type. Forwarders that are not penultimate forwarders forward all information but do not store all information received about a service type. For example, non-penultimate forwarders do not store data in opaque properties field 224. The use of penultimate forwarders allows the SAF to scale to large networks with a great number of service nodes, by reducing the amount of data stored at each forwarder. In some embodiments, especially in networks of limited size and services, all forwarders store all information about all services and no special role is assigned to penultimate forwarders. In such embodiments, step 412 is omitted.

In some embodiments, the determination that the forwarder is a penultimate forwarder is made regardless of any service instance that may be included in the service type. For example, in some embodiments, a forwarder (e.g., forwarder 146a) is a penultimate forwarder for dial number directory services regardless of whether the service is provided by a connected service client (e.g., service client 136a) or a remote service client (e.g., service client 136b and service client 136c). Thus forwarder 146a would store data from opaque properties field 224 for all dial number directory service types received, even if that data originated in service node 130b and service node 130c, as indicated by different values in service instance field 216.

Similarly, in some embodiments, the determination that the forwarder is a penultimate forwarder is made regardless of any service sub-category that may be included in the service type. For example, in some embodiments, a forwarder (e.g., forwarder 146a) is a penultimate forwarder for unified communications services regardless of whether the service sub-category is dial number directory service, as provided by service node 130a, or PSTN gateway service, or voice mail service or conference call service.

After step 412, control passes to step 414. In step 414 it is determined whether the service type indicated in the received message is already stored locally in association with the sender. For example, it is determined whether the data in the service type field 204 matches the data in the service type field 333 associated with an advertising node ID in field 331 that matches the sending node ID in field 202 (or in field 232 for an update message). If not, then the information is new service information and control passes to step 420, described below, to process the new service information.

If it is determined in step 414 that the service type indicated in the received message is already stored locally in association with the sender, then control passes to step 416. In step 416, it is determined whether the message has a later sequence number than the data already stored. For example, it is determined whether the data in the sequence number field 222 is greater than the data in the sequence number field 335 associated with an advertising node ID in field 331 that matches the sending node ID in field 202 (or in field 232 for an update message). If not, then the information is old service information and does not need to be stored or forwarded. Control passes back to step 410 and following steps to determine what kind of message is received next. If it is determined in step 416 that the message has a later sequence number than the data already stored, control passes to step 420 to process the new service information.

In step 420, new service information is processed. In the illustrated embodiment, step 420 includes incrementing a cost metric for obtaining the service, sending updates to all connected forwarders and any connected service clients that have previously subscribed to the service, and storing a standard part of the service data.

Step 420 includes incrementing a cost metric. A cost increment is a measure of communication cost for communications between the local forwarder and the node that sent the message (a service node for message 201 or another forwarding node for update message 231). Metrics of cost to traverse links in a network are well known in the art of routing. Any method known in the art may be used to determine a cost metric value for a link. For example, in some embodiments a cost on a link is given approximately by Equation 1, which is an approximation of a more comprehensive cost metric that includes seven terms.

$$\text{Cost metric} = \text{bandwidth} * 10^{-7} + (\text{sum of link travel time delays}) * 256 \qquad (1)$$

Such costs are available for each link on routers that serve as forwarders, including routers executing EIGRP. In other embodiments, other measures of cost are used. For embodiments that involve a forwarder that is not executing on a router, a two way travel time between communicating nodes can be tested and effective data rate can be determined and error rates can be measured and a cost can be determined based on some combination of these measured effects.

The incremental cost of communications between the receiving forwarder and the sending node is determined and added to the cost, if any, advertised by the sending node. In some embodiments, the incremental cost is determined once or infrequently (e.g., during step 402) and used repeatedly when a message is received. In a service publication message 201, no cost is advertised, so the total cost metric is just the incremental cost. In a service update message 231, an advertised cost is indicated in the cost metric field 236, so the total cost metric is a combination (such as a sum) of the incremental cost and the cost indicated in field 236.

Step 420 includes sending an update message. For example, service update message 231 is formed with data in field 209 that indicates the message is a service update message. Data is inserted in field 232 that indicates the ID of the forwarding node on which the local forwarder executes. Data is inserted in field 204 and field 208 that matches the data in field 204 and field 208, respectively, of message 201. Data indicating the total, incremented cost metric is inserted into field 236. The service update message 231 so formed is sent to all other nodes connected to the local forwarder, as determined during step 402. In some embodiments, the message 231 is not sent to the node that sent the message received. Loops are prevented because a forwarder that receives data already received, as indicated by the combination of values in the service type field 204 and sequence number field 222, will not forward the information.

Step 420 includes notifying a subscribing server client node. As described in more detail below with reference to step 464, each forwarder keeps a list of any connected service nodes that have requested a particular service type. If the service type received in field 204 matches a service type associated with a subscribing service node, then that service node is notified that the service is now available. In some embodiments, the notification comprises sending an update message 231 to the subscribing service node.

Step 420 includes storing a standard part of the service data. In the illustrated embodiment, the standard part of the service data includes the data in the service type field 204 and the data in the sequence number field 222 but excludes the data in the opaque properties field 224. In some embodiments, the data is stored exactly as received and in other embodiments data is stored based on the data received, such as storing some or all of the data received in a compressed form. In the illustrated embodiment, the data in field 204 is stored in field 333 of data structure 330 and the data in field 222 is stored in field 335 of data structure 330. If the message received is a service publication message 201, the data in field 202 is stored in field 331 in association with the data stored in field 333 and field 335. If the message received is a service update message 231, then the data in field 232 is stored in field 331 and the data in field 236 is stored in field 334 in association with the data stored in field 333 and field 335.

In the illustrated embodiment, step 420 includes updating the forwarding table 320. As advertised service data structure 330 is updated, during step 420, the forwarder determines the new total cost and determines if the new total cost is lower than a value in field 324 of the forwarding table 320 for the corresponding service type. If so, the new total cost and connected node are inserted into fields 324 and field 323, respectively. In some embodiments a backup next node is also determined, called a feasible successor, based on the DUAL algorithm, well-known in the art. An advertising node that is associated with a reported cost in field 334 that is lower than the total cost in field 324 in the forwarding table 320 for the same service type in field 333 that is in field 322 can not rely on a path that loops back through the local forwarder; and therefore is a loop-free alternative that may serve as a backup. Thus if communications with the forwarder indicates in the next node field 323 is lost, the feasible successor may be inserted into the next node field 323 immediately. The total cost through the new next node is determined and inserted into the total cost field 324. In the illustrated embodiment, the cost inserted into the cost metric field 238 of the update message formed and sent is the lowest total cost to reach that type of service, as determined from the forwarding table 320.

In step 422, it is determined whether the local forwarder is a penultimate forwarder for the service type. If not, control passes back to step 410 and following steps to determine what kind of message is received next. If the local forwarder is a penultimate forwarder for the service type, then the data in the opaque service properties in field 224 of the message is stored locally. For example, the data in the opaque properties field 224 of the receive message is stored in opaque service properties field 336 associated with an advertising node ID in field 331 that matches the ID of the sending node in field 202 of a publication message 201 (or field 232 of a service update message). Control then passed back to step 210. In embodiments in which all service data is stored on all forwarders, step 422 is omitted and control passes directly from step 420 to step 424. In embodiments in which all service data is not stored on any forwarders, step 422 is omitted and control passes directly from step 420 to step 410.

If it is determined, in step 410, that the local forwarder has not received a service publication message from a service client node, then control passes to step 430. In step 430, it is determined whether the local forwarder received a service update message from another forwarder. If so, control passes to step 414 and following steps, described above. The steps operate on the data in the forwarder ID field 232, service type field 204, cost metric field 236 and service attributes field 208 of update message 231 instead of fields in publication message 201.

If it is determined in step 430 that the local forwarder did not receive a service update message from another forwarder, control passes to step 450 and following steps depicted in FIG. 4B.

In step 450, it is determined whether the local forwarder receives a service request message from a service client node. For example, it is determined whether the local forwarder 140a receives a service request message 251 from a service client 130a. A request message 251 from a service client 136 can be distinguished from a request message 251 from another forwarder (e.g., forwarder 146b) using any method. In some embodiments, the different types of requests are distinguished by different values in the message type field 209. In some embodiments, the different types of requests are distinguished because the requesting node ID in field 252 is matched to an ID of a service client registered during step 402 rather than being matched to an ID of a forwarder registered during step 402.

If it is determined, in step 450, that the local forwarder receives a service request message from a service client node, control passes to step 452. In 452 the forwarder is determined to be a penultimate forwarder for the service type. Control then passes to step 453.

As described above, it is often the case that a requesting service node does not know (or care) about a value for an instance of a particular service and the field 266 is filled with a value that indicates any value or a range of values is acceptable, or field 266 is omitted. In such a case, the local forwarder would be a penultimate forwarder for any instance of the service type and save detailed service properties for a range of instances of the service.

In some embodiments, only forwarders connected to providers of a service type, which send service publication messages 201, are penultimate routers, and step 452 is omitted.

In step 453 the service client node is added to a notification list of subscribers in association with the requested service type. Control then passes to step 454.

In step 454 it is determined whether the service type indicated in the received message is already stored locally for a node different from the requesting service client. For example, in some embodiments, it is determined whether the data in the service type field 254 matches the data in the service type field 333 for any record in data structure 330 in which advertising node ID in field 331 is not the requesting service client node in field 252 of the request message 251. Wildcard values in field 264 or field 266 of field 254 are considered a match to corresponding fields in field 333. If there is not a match for a different advertising node, or there is no match of type at all, then a different provider of the requested service is unknown to the local forwarder, and control passes to step 462 to react to a request for an unknown provider of the service type.

In step 462, the local forwarder reacts to a request for an unknown provider of a service type. Step 462 includes sending a query to all the other forwarders connected to the local forwarder. A query is structured like a request message 251. In some embodiments, the value in the message type field 209 is different for a query than for a request message from a forwarder or from a service client. Control then passes back to step 210 and following steps to determine the next type of message received.

If it is determined in step 454 that the service type indicated in the received message is already stored locally for a node different from the requesting service client, then control passes to step 456. In step 456 it is determined whether the stored service data includes opaque service properties. When the stored service data includes the opaque service properties, the stored service data is said to be "complete." For example, it is determined whether the opaque service properties field 336, which is associated with the service type field 333 that matches the service type requested in field 254 and associated with an advertising node with ID in field 331 different from the ID of the requesting node in field 252, is present and contains non-null data. If the stored service data is complete, control passes to step 466. In embodiments in which all forwarders store all service data, step 456 is omitted and control passes directly from the YES branch of step 454 to step 466.

In step 466, a reply message is returned to the requesting node. A reply message is structured like an update message but is sent only to the original requesting node and not to any or all forwarders. For example, a reply message like update message 231 is formed with data in field 209 that indicates the message is a service reply message. Data is inserted into field 232 that indicates the ID of the local forwarder. Data is inserted into field 204 and field 222 and field 224 that matches the data in field 233 and field 335 and field 336, respectively, of the corresponding record with complete stored service data in data structure 330. The cost metric in field 334 is incremented with the cost to communicate from the local forwarder to the advertising node indicted by the data in corresponding field 331; and data indicating the incremented cost metric is inserted into field 236. The service update message 231 so formed is sent to the requesting node, e.g., using the IP address of the requesting node in field 252 of the request message 251 in an IP unicast. Control then passes back to step 210 and following steps to determine the next type of message received.

If it is determined in step 456 that the stored data is not complete, control passes to step 470. In step 470, the request is forwarded to one connected node (forwarder or service client) that advertises a particular service type that matches the request. When the request includes wildcard values, there are several service types that match the request. For each unique service type that matches the request, the forwarder sends a request to the one connected node that involves the lowest total cost to reach the service type.

In the illustrated embodiment, the forwarder stores in the service forwarding table 320 one entry for each unique service type. Data indicating the unique service type is inserted into field 322. The forwarder then determines the total cost to every connected node that advertised that service type, and selects the connected node with the lowest total cost. Data that indicates the lowest total cost in inserted into field 324, and data that indicates the connected node that offers the lowest total cost is inserted into the next node field 323. When routers are used as forwarders, the network interface to the neighbor that has the lowest total cost is inserted into the next node field 323.

As described above, when the advertised service data structure 330 is updated, during step 420, the forwarder determines the new total cost and determines if the new total cost is lower than a value in field 324 for the corresponding service type. If so, the new total cost and connected node are inserted into fields 324 and field 323, respectively. In the illustrate embodiment a new feasible successor, if any, is also determined.

By sending the request to the lowest cost connected node, the request finds the service client (or penultimate forwarder) that stores the complete data by the best path, without duplication of effort and without loops; and thus without excess consumption of network reroutes.

After step 470 control passes to step 410 and following steps to determine the type of the next message received.

If it is determined, in step 450, that the local forwarder did not receive a service request message from a service client node, then control passes to step 480. In step 480, it is determined whether that the local forwarder received a service request message or query message from another forwarder. If not, control passes back to step 410 and following steps to determine the type of message received.

If it is determined, in step 480, that that the local forwarder received a service request message or query message from another forwarder, control passes to step 454, described above. If the requested service type is not stored locally, control passes to step 462 to send a query to all forwarders. If the requested service type is stored locally and is complete, control passes to step 466 to send an update to the requesting forwarder. If the requested service type is stored locally and is not complete, then control passes to step 470 to send a request message to the lowest cost connected node that advertised that service, as indicated in the forwarding table 320.

3.2 Method at Service Node

FIG. 5 illustrates an example method 500 at a service client node. For example, the steps of method 500 are performed by service client process 136a on service node 130a.

In step 502 the service client registers with one or more forwarders. For example, service client 136a is configured to establish a communication session with service forwarder process 147a on forwarder 140a.

In step 510, the service client generates and sends a service publication message for a new or updated service provided by the service client. For example, service client 136a sends service publication message 201 for a dial number directory service type to service forwarder 147a with opaque properties that list an IP address of node 130a, a calling protocol (e.g., SIP) and all dial numbers from 555-1701 to 555-1777.

In step 520, the service client generates and sends a service request message for a new service desired by the service client. For example, service client 136a sends to service forwarder 147a service request message 251 for a dial number directory service type from other service clients.

In step 530, the service client receives and processes any update messages or replies received from a forwarder. For example, service client 136a receives from service forwarder 147a an update message for dial number service type from service client 136b with opaque properties that list an IP address of node 130b, a calling protocol (e.g., SIP) and all dial numbers from 555-1801 to 555-1888. This information is stored and used by the service client to set up communications session for voice or video data to dial numbers 555-1801 to 555-1888.

Control then passes back to step 510 and following steps to send any additional publication messages, send any additional request message or process any additional update messages received.

3.3 Dial Number Directory Embodiment

Current call agents provide dial plan features that are suitable for many purposes but are subject to some deficiencies. Several deficiencies arise because the call agents are manually configured with external routes to all the other call agents; such configuration is tedious and error prone. Thus the managers are not quickly re-configured when a change occurs in the service provided or the network used to deliver the service.

For example, manually configured routes indicate that a particular DN range is associated with the IP address of a particular call agent, but typically the manually configured data does not indicate whether the remote call agent is reachable via the IP network.

As a further example, many call devices are mobile and can be carried to a different location where they could be controlled by a different call agent at lower cost than using the original call agent. If the change persists long enough, manual configuration may eventually reflect the change, but if the change is temporary, the call manger is typically not reconfigured. Thus if an employee relocates to a different office for a two-week period, calls to that employee's device's dial number are still managed by a call manger that may be hundreds of miles away which may not even be aware that the device is at the new location. For example, consider device 1 with DN 555-800-1234, which is normally managed by call agent 1. Call agent 1 owns the entire DN range 555-800-XXXX and advertises it into the network via SAF. Now device 1 temporarily moves to a different site, which is managed by call agent 2. Call agent 2 owns a different DN range, 555-900-XXXX. An anticipated embodiment allows device 1 to temporarily register with call agent 2, which changes the agent 2 SAF advertisement to also include a very specific route for DN 555-800-1234, as well as its own range 555-900-XXXX. A call is now placed to 555-8000-1234 from a device controlled by call agent 3. Call agent 3 has two routes in its routing table that match the dialed number: a generic route 555-800-XXXX pointing to call agent 1 and a very specific route 555-800-1234 pointing to call agent 2. Using "longest-match" routing logic, call agent 3 will send the call to call agent 2.

As a further example, a subscriber may have both a cell phone and a land line. Calls on the land line are less expensive, but if the land line is down, calls should be re-routed to the cell phone. Because the call agent does not track whether the land line is down, the call agent is unable to determine automatically to re-route calls to the cell phone.

An illustrated dial number embodiment avoids these problems to which manually configured call agents are subject.

It is assumed for purposes of illustration that a call agent process executing on call agent node 131a, with IP address 10.1.1.1, controls calls for end nodes, such as end node 180, on LAN 104 through intermediate network nodes 120 that serve as bridges for voice data packets. It is also assumed that these end nodes have IP addresses in the range 10.1.1.0/24 and dial numbers in the range 999-555-1701 to 999-555-1777 and that, in particular, end node 180 has an IP address of 10.1.1.7 and a dial number of 999-555-1707. It is further assumed for purposes of illustration that a call agent process executing on call agent node 131b, with IP address 10.1.2.1, controls calls for end nodes that have IP addresses in the range 10.1.2.0/24 and dial numbers in the range 999-555-1801 to 999-555-1888. It is further assumed for purposes of illustration that a call agent process executing on call agent node 131c, with IP address 10.1.3.1, controls calls for end nodes that have IP addresses in the range 10.1.3.0/24 and dial numbers in the range 999-555-1901 to 999-555-1999. This information is listed for convenience in Table 1.

TABLE 1

Initial configuration data for example dial directory embodiment.

| service node | IP address | IP range | Dial number range |
|---|---|---|---|
| CM node 131a | 10.1.1.1 | 10.1.1.0/24 | 999-555-1701 to 1777 |
| CM node 131b | 10.1.2.1 | 10.1.2.0/24 | 999-555-1801 to 1888 |
| CM node 131c | 10.1.3.1 | 10.1.3.0/24 | 999-555-1901 to 1999 |

In other embodiments, each dial number has other values associated with it, such as a subscriber name associated with the number and a rank indicating the desirability of using the particular number for that subscriber. It is further assumed for purposes of illustration that the call agent processes executing on call agent node 131a, call agent node 131b and call agent node 131c include service client process 137a, service client process 137b and service client process 137c, respectively.

It is further assumed that core network 111 includes the routers 141 that run the EIGRP routing protocol and serve as service forwarding nodes by virtue of service forwarders 147 included on each router 141.

In the illustrated embodiment, each call agent node is connected by a direct communication link with one router that serves as a forwarding node for purposes of illustration, but in other embodiments it is practical to have each call agent node connected by a direct link to a second router serving as a forwarding node to provide redundancy in the event of a link or router failure. Call agent node 131a is connected by a direct link to router 141a; call agent node 131b is connected by a direct link to router 141d and call agent node 131c is connected by a direct link to router 141f.

As the routers 141 are connected in the arrangement depicted in FIG. 1B, they form adjacencies as part of the EIGRP discovery process. The service forwarder 147 on each router uses this adjacency information as the data received about connected forwarders indicated in step 402. Each router determines a cost to communicate with a directly linked router and stores this link cost with a link identifier in link data field 338 for each direct link.

The service client 137a on call agent node 141a registers with the service forwarder process 147a on router 141a during step 502. The information received by service forwarder 147a effects step 402 on router 141a. The forwarder 147a determines a cost to communicate with a directly linked service client and stores this link cost with a link identifier in link data field 338. Thus, after step 402, forwarder 147a is aware of service client 137a through one direct link, and forwarder 147b, forwarder 147g and forwarder 147h, through three other direct links, and the costs to traverse each link. It is assumed for purposes of illustration that the cost to traverse each link is 1.

During step 510, service client 137a generates and sends a publication message for the dial number directory service performed by the call agent process on call agent node 131a. Some contents of that publication message are listed in Table 2. It is assumed for purposes of illustration that the service type is indicated by a category of 100 for unified communications and a subcategory of 10 for dial number directory and an instance of 1 for node 131a, designated by three values separated by dots, e.g., 100.10.1. The data in the opaque service properties field lists sample dial number directory information.

TABLE 2

Example publication message from call agent node 131a.

| Publishing Node | Service type | Seq. # | Opaque properties |
|---|---|---|---|
| 10.1.1.1 | 100.10.1 | 1000 | 10.1.1.1; port = 999; SIP; 999-555-1701 to 1777; . . . |

During step 410 through step 424 at forwarder 147a on router 141a, the forwarder determines that it is a penultimate forwarder for this service type, that such data is not already stored for sender 10.1.1.1, and thus stores service data with opaque properties in advertised service data structure 330 of forwarder 147a on router 141a. Table 3 lists the data stored in a record of data structure 330 of forwarder 147a. By definition, the reported cost to obtain the service on the publishing service client is zero. This record is associated with the link data field 338 that indicates the link to the call agent node 131a with a cost=1.

TABLE 3

Example record in forwarder 147a after receipt of publication message

| Advertising Node | Service type | Reported Cost | Seq. # | Opaque Service properties |
|---|---|---|---|---|
| 10.1.1.1 | 100.10.1 | 0 | 1000 | 10.1.1.1; port = 999; SIP; 999-555-1701 to 1777; ... |

During step 420, the service forwarding table 320 is updated for forwarder 147a. An entry is made indicating the service type is 100.10.1 in field 322, the next node is the link to call agent node 131a in field 323 and the total cost is the link cost=1 in field 324.

Also during step 420, a service update message is sent to all the other forwarders 147b, 147g, 147h with direct links to the router 141a that hosts forwarder 147a, as determined during step 402. Table 4 lists the data in the update message sent from forwarder 147a to the other forwarders 147b, 147g, 147h. The cost metric is the sum of the reported cost (0) plus the cost (1) of the link between service client 137a and forwarder 147a. It is assumed for purposes of illustration that router 141a has the IP address 12.34.56.1.

TABLE 4

Example update message sent by forwarder 147a

| Forwarder ID | Service type | Cost Metric | Seq. # | Opaque Service properties |
|---|---|---|---|---|
| 12.34.56.1 | 100.10.1 | 1 | 1000 | 10.1.1.1; port = 999; SIP; 999-555-1701 to 1777; ... |

The forwarders 147b, 147g, 147h each receive this update message. During step 430 through step 422 at each of forwarders 147b, 147g, 147h, the forwarder determines that such data is not already stored for sender 12.34.56.1, and thus stores service data in advertised service data structure 330. Since these forwarders are not penultimate forwarders for this service type (they have not received a publication or subscription message for this service type), they do not store the opaque service properties. They do generate and send an update message that includes the opaque properties to their directly linked forwarders, learned during step 402 on each of them.

Thus the service type 100.10.1 published by service client 137a is learned by all the forwarders 147 in core network 111. Each forwarder stores the service type with its reported cost, increments the cost and sends to another forwarder. Each forwarder learns of the cost to reach the service type 100.10.1 from one or more other forwarders and enters in the service forwarding table 320 the lowest cost link to use to reach that service type. Thus the lowest cost to reach service 100.10.1 from forwarder 147a is 1; from forwarders 141b, 147g, and 147h is 2; from forwarders 147c, 147d, 147e, 147i is 3; and from forwarder 131f is 4. Each forwarder also determines, using the DUAL algorithm, the loop-free alternative link to reach that service. Thus forwarder 141g has a path that costs 2 to reach service 100.10.1 through its link to forwarder 147a and a backup path (cost=3) through its link with forwarder 141h which also reports a cost of 2. However, until another call agent client registers, only forwarder 147a is a penultimate forwarder that stores the opaque service properties.

During step 520 on service client 137a, a service request message 251 is generated and sent to receive dial number directory service from any other call agent nodes in the network 101. Because the service client 137a does not know what instance is available to provide the service, the request is generated with a wildcard value in the instance field. It is assumed for purposes of illustration that a value 0 is a wildcard value. Table 5, lists the contents of the fields in the request message sent by service client 137a in the call manger process on call agent node 131a.

TABLE 5

Example request message

| Requesting Service Node | Service type |
|---|---|
| 10.1.1.1 | 100.10.0 |

During step 450 through step 462 at forwarder 147a on router 141a, the forwarder 147a determines that it is a penultimate forwarder for this service type (i.e., a penultimate forwarder for all dial number directory service no matter what instance), adds the service client 137a to a notification list, determines that such data is not already stored, and thus sends a query to all other forwarders for opaque service properties for such a service. Because no other forwarder is a penultimate forwarder, no other forwarder has stored such opaque properties data and no forwarder responds with a reply message.

When service client process 137b of a call manger process executing on call agent node 131b generates and sends a publication message during step 510 to forwarder 147d, the service client 137a will automatically learn of the availability of the service. For purposes of illustration, it is assumed that during step 510, service client 137b generates and sends a publication message for the dial number directory service performed by the call agent process on call agent node 131b. Some contents of that publication message are listed in Table 6.

TABLE 6

Example publication message from call agent node 131b.

| Publishing Node | Service type | Seq. # | Opaque properties |
|---|---|---|---|
| 10.1.2.1 | 100.10.2 | 200 | 10.1.2.1; port = 1999; H.323; 999-555-1801 to 1888; ... |

During step 420 on forwarder 147d, a service update message is sent to all the other forwarders 147e, 147g, 147h with direct links to the router 141d that hosts forwarder 147d, as determined during step 402. Table 7 lists the data in the update message sent from forwarder 147d to the other forwarders 147e, 147g, 147h. The cost metric is the sum of the reported cost (0) plus the cost (1) of the link between service client 137b and forwarder 147d. It is assumed for purposes of illustration that router 141d has the IP address 12.34.56.4.

TABLE 7

Example update message sent by forwarder 147d

| Forwarder ID | Service type | Cost Metric | Seq. # | Opaque Service properties |
|---|---|---|---|---|
| 12.34.56.4 | 100.10.3 | 1 | 200 | 10.1.2.1; port = 1999; H.323; 999-555-1801 to 1888; . . . |

The forwarders 147e, 147g, 147h each receive this update message. During step 430 through step 422 at each of forwarders 147e, 147g, 147h, the forwarder determines that such data is not already stored for sender 12.34.56.4, and thus stores service data in advertised service data structure 330. Since these forwarders are not penultimate forwarders for this service type (they have not received a publication or subscription message for this service type), they do not store the opaque service properties. They do generate and send an update message with the opaque properties to their directly linked forwarders, learned during step 402 on each of them.

Thus the service type 100.10.2 published by service client 137b is learned by all the forwarders 147 in core network 111. Each forwarder stores the service type with its reported cost, increments the cost and sends to another forwarder. Each forwarder learns of the cost to reach the service type 100.10.2 from one or more other forwarders and enters in the service forwarding table 320 the lowest cost link to use to reach that service type. Both forwarder 147d and forwarder 147a are penultimate forwarders that store the opaque service properties. The other forwarders do not store the opaque service properties.

During step 420 at forwarder 147a on router 141a, the forwarder notifies the subscribing client 137a, on the notification list, of the update. The update message sent from the forwarder 147a to the service client 137a is listed in Table 8. In some embodiments, the notification to the service client does not include the cost metric field 236.

TABLE 8

Example update message sent by forwarder 147a to client 137a

| Forwarder ID | Service type | Cost Metric | Seq. # | Opaque Service properties |
|---|---|---|---|---|
| 12.34.56.1 | 100.10.3 | 3 | 200 | 10.1.2.1; port = 1999; H.323; 999-555-1801 to 1888; . . . |

During step 530, the service client 137a receives and processes the update. Thus the call manger executing on call agent node 131a automatically learns of the dial number directory service on a remote call manger without manual re-configuration. This automatic configuration is performed automatically even in the failure of one or more links in core network 111, because each forwarder is aware of any alternate links that may be used if a link or forwarder fails.

During step 520 on service client 137b, a service request message 251 is generated and sent to receive dial number directory service from any other call agent nodes in the network 101. Because the service client 137b does not know what instance is available to provide the service, the request is generated with a wildcard value in the instance field. Table 9 lists the contents of the fields in the request message sent by service client 137b in the call agent process on call agent node 131b.

TABLE 9

Example request message from service client 137b.

| Requesting Service Node | Service type |
|---|---|
| 10.1.2.1 | 100.10.0 |

During step 450 through step 470 at forwarder 147d on router 141d, the forwarder 147d determines that it is a penultimate forwarder for this service type (i.e., a penultimate forwarder for all dial number directory service no matter what instance), adds the service client 137b to a notification list. The forwarder 147d also determines that service data is already stored for service 100.10.1 that matches the wildcard request 100.10.0, and that the service data is not complete with opaque service properties. In step 470, forwarder 470 sends the request for service 100.10.1 only along the best path to forwarder 147g. (It is assumed for purposes of illustration that forwarder 147g is selected over equal cost forwarder 147h by virtue of a tie breaking procedure to select the forwarder on a router with the lowest IP address). At forwarder 147g the request is forwarded only to forwarder 147a. Forwarder 147a is a penultimate forwarder that has stored the complete opaque service properties data and thus forwarder 147a generates and sends a reply during step 466. The request includes the IP address 10.1.2.1 of the requesting service node, so the reply is sent in an IP unicast directly to the call agent node 131b.

In step 530 on service client 137b, the reply message is received and processed by the call manger executing on call agent node 131b. Thus the call agent on call agent node 131b automatically learns of the dial numbers available on call agent node 131a without manual configuration.

Changes are also automatically propagated between service clients. For purposes of illustration, it is assumed that end node 180 is removed from LAN 104c and is re-attached to a LAN connected to call agent node 131b.

Upon connecting to call agent node 131b, the call manger on call agent node 131b learns that an IP address has been assigned to a device with a dial number of 999-555-1707. For purposes of illustration, it is assumed that the IP address assigned to this device is 10.1.2.177. Thus an entry is added to the dial number directory. The service client 137b sends a publication message with the revised service properties adding IP address 10.1.2.177 and the associated dial number 999-555-1707. The new publication message has an increased sequence number, as listed in Table 9.

TABLE 9

Example updated publication message from call agent node 131b.

| Publishing Node | Service type | Seq. # | Opaque properties |
|---|---|---|---|
| 10.1.2.1 | 100.10.2 | 202 | 10.1.2.1; port = 1999; H.323; 999-555-1801 to 1888; . . . ; 999-555-1707. |

During step 410 through step 424 at forwarder 147d on router 141d, the forwarder determines again that it is a penultimate forwarder for this service type, that such data is already stored for sender 10.1.2.1 but with an earlier sequence number, and thus stores service data with opaque properties in advertised service data structure 330 of forwarder 147d on router 141d. Updates to the forwarding table are not involved.

Also during step 420, a service update message is sent to all the other forwarders 147e, 147g, 147h with direct links to the router 141d that hosts forwarder 147d, as determined during step 402. Each of those updates the service data stored in data structure 330. Updates to the forwarding table are not involved on these forwarders either. Eventually the update reaches all the forwarders and service client 137a.

In another example, a call agent node 131b becomes disconnected from the network. Router 141d learns of this failure and changes the cost to reach call agent node 131b to infinite. Forwarder 147a learns of this change and updates the service forwarding table. An update message is sent by the forwarder 147d with the cost changed to infinite. Eventually the call agent on call agent node 131a learns that call numbers associated with the call agent on node 131b, e.g., 999-555-1800 to 1888 are not reachable through the IP network.

In some embodiments, the opaque service information includes a PSTN number that can be used to reach any or all of the DNs advertised. For example, the opaque properties advertised by service client 137b include the alternate DN PSTN 800-555-2222 ext 1800 to 1888. In such embodiments, upon learning of infinite cost to reach the call agent on node 131b, the call agent on node 131a would direct calls to 999-555-1818, for example, to the alternate DN 800-555-2222 ext 1818 with no additional configuration, and transparently to the user. In some embodiments, the advertised DNs are abbreviated "on-network numbers" while the alternative DNs are the real E.164 numbers used by the PSTN corresponding to the abbreviated numbers.

As demonstrated in this embodiment, the service advertisement framework (SAF) provides a means to make use of multiple links among network nodes to provide resilient, non-looped paths that reflect actual connection conditions to automatically configure service nodes in a way that scales to large networks with a great number of nodes.

4.0 Implementation Mechanisms—Hardware Overview

Figure 6:
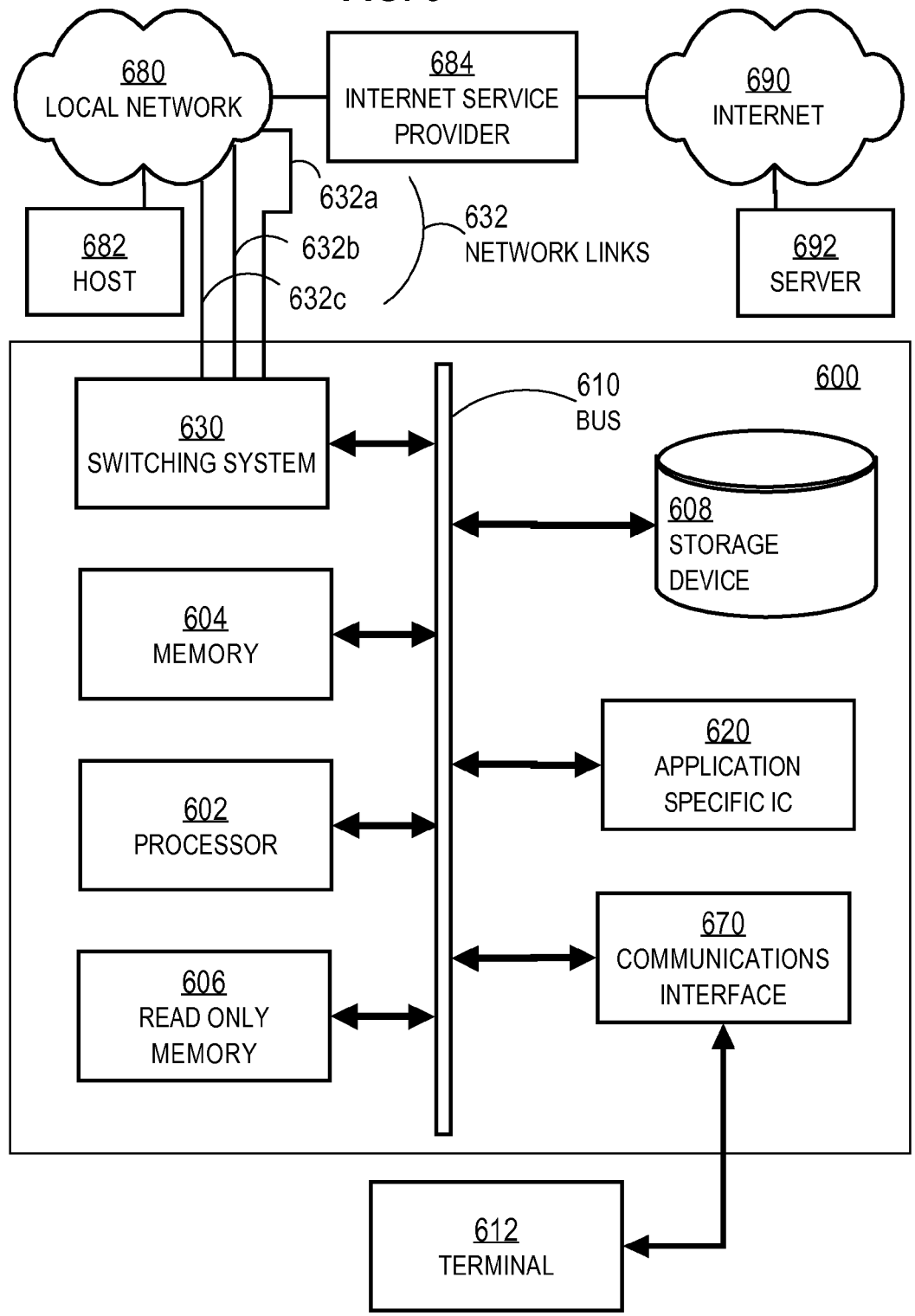
FIG. 6 illustrates a computer system upon which an embodiment of the invention may be implemented.

FIG. 6 illustrates a computer system 600 upon which an embodiment of the invention may be implemented. The preferred embodiment is implemented using one or more computer programs running on a network element such as a router device. Thus, in this embodiment, the computer system 600 is a router.

Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made variations in amplitude, frequency, phase, polarization or other physical properties of carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 610 for use by the processor from an external terminal 612, such as a terminal with a keyboard containing alphanumeric keys operated by a human user, or a sensor. A sensor detects conditions in its vicinity and transforms those detections into signals compatible with the signals used to represent information in computer system 600. Other external components of terminal 612 coupled to bus 610, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 612. In some embodiments, terminal 612 is omitted.

Computer system 600 also includes one or more instances of a communications interface 670 coupled to bus 610. Communication interface 670 provides a two-way communication coupling via transmission media to a variety of external devices that operate with their own processors, such as printers, scanners, external disks, and terminal 612. Firmware or software running in the computer system 600 provides a terminal interface or character-based command interface so that external commands can be given to the computer system.

For example, communication interface 670 may be a parallel port or a serial port such as an RS-232 or RS-422 interface, or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented using carrier waves. For wireless links, the communications interface 670 sends and receives electrical, acoustic or electromagnetic signals, including infrared and optical signals, which carry information streams, such as digital data.

In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 600 includes switching system 630 as special purpose hardware for switching information for flow over a network. Switching system 630 typically includes multiple communications interfaces, such as communications interface 670, for coupling to multiple other devices. In general, each coupling is with a network link 632 that is connected to another device in or attached to a network, such as local network 680 in the illustrated embodiment, to which a variety of external devices with their own processors are connected. In some embodiments, an input interface or an output interface or both are linked to each of one or more external network elements. Although three network links 632a, 632b, 632c are included in network links 632 in the illustrated embodiment, in other embodiments, more or fewer links are connected to switching system 630. Network links 632 typically provides information communication via transmission media through one or more networks to other devices that use or process the information. For example, network link 632b may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides routing information for use with switching system 630.

The switching system 630 includes logic and circuitry configured to perform switching functions associated with passing information among elements of network 680, including passing information received along one network link, e.g. 632a, as output on the same or different network link, e.g., 632c. The switching system 630 switches information traffic arriving on an input interface to an output interface according to pre-determined protocols and conventions that are well known. In some embodiments, switching system 630 includes its own processor and memory to perform some of the switching functions in software. In some embodiments, switching system 630 relies on processor 602, memory 604, ROM 606, storage 608, or some combination, to perform one or more switching functions in software. For example, switching system 630, in cooperation with processor 604 implementing a particular protocol, can determine a destination of a packet of data arriving on input interface on link 632a and send it to the correct destination using output interface on link 632c. The destinations may include host 682, server 692, other terminal devices connected to local network 680 or Internet 690, or other routing and switching devices in local network 680 or Internet 690.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620 and circuits in switching system 630, may be used in place of or in combination with software to implement the invention. Thus, embodiments of the invention are not limited to any specific combination of hardware and software, unless otherwise explicitly stated.

The signals transmitted over network link 632 and other networks via transmission media through communications interfaces such as interface 670, carry information to and from computer system 600. Computer system 600 can send and receive information, including program code, through the networks 680, 690 among others, through network links 632 and communications interfaces such as interface 670. In an example using the Internet 690, a server 692 transmits program code for a particular application, requested by a message sent from computer 600, through Internet 690, ISP equipment 684, local network 680 and network link 632b through communications interface in switching system 630. The received code may be executed by processor 602 or switching system 630 as it is received, or may be stored in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 632b. An infrared detector serving as communications interface in switching system 630 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602 or switching system 630.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving, at a first forwarding node of a communications network from a second forwarding node of the communications network, a first update message that includes forwarded service type data that indicates a type of service available via the second forwarding node, and forwarded cost data that indicates a first cost of communications to obtain the type of service via the second forwarding node,
wherein the type of service is different from data packet routing through the network and wherein the type of service is a dial directory to associate a network address with a user identifier for telephony using the Internet Protocol;
determining an incremental cost for communications between the first forwarding node and the second forwarding node;
storing, at the first forwarding node, service data that indicates the type of service is associated with the second forwarding node at a total cost based on the first cost and the incremental cost; and
sending a second update message that includes forwarded cost data based on the total cost.

2. A method as recited in claim 1, said step of sending the second update message further comprising sending the second update message that includes the forwarded service type data that indicates the type of service available via the second forwarding node.

3. A method as recited in claim 1, said step of sending the second update message further comprising sending the second update message to every forwarding node in communication with the first forwarding node and different from the second forwarding node.

4. A method as recited in claim 1, wherein:
said step of receiving the first update message further comprises receiving the first update message that includes forwarded service property data that indicates particular properties of the type of service available via the second forwarding node; and
said step of sending the second update message further comprises sending the second update message that includes the forwarded service property data.

5. A method as recited in claim 4, wherein:
the method further comprises determining whether the first forwarding node is a penultimate forwarding node comprising determining whether a service node of the communications network has sent a message to the first forwarding node, wherein a service node is a node that provides the type of service or consumes the type of service or both; and
if the first forwarding node is a penultimate forwarding node, then said step of storing service data further comprises storing service data that includes the forwarded service property data.

6. A method as recited in claim 1, wherein:
said step of receiving the first update message further comprises receiving the first update message that includes sequence data that indicates a version of the type of service available via the second forwarding node;
the method further comprises
determining whether the sequence data indicates a later version of the type of service available than is already stored in the service data at the first forwarding node; and
if it is determined that the sequence data indicates a later version, then performing said step of storing the service data, further comprising storing service data that includes the sequence data.

7. A method as recited in claim 1, wherein service type data includes instance data that indicates uniquely a particular node that provides the type of service.

8. A method as recited in claim 1, further comprising the steps of:
receiving, at the first forwarding node from a service node of the communications network, a publication message that includes
published service type data that indicates a type of service available at the service node, and
published service property data that indicates particular properties of the type of service available at the service node;
determining an initial cost for communications between the first forwarding node and the service node;
storing, at the first forwarding node, service data that indicates the type of service available at the service node for the initial cost; and
sending a third update message that includes
forwarded service type data that indicates the type of service available at the service node, and
forwarded cost data that indicates the initial cost.

9. A method as recited in claim 8, wherein said storing service data further comprising storing service data that indicates the particular properties of the type of service available at the service node.

10. A method as recited in claim 8, wherein said step of sending a third update message further comprises sending the third update message that includes service property data that indicates the particular properties of the type of service available at the service node.

11. A method as recited in claim 1, further comprising the steps of:
receiving, at the first forwarding node from a requesting node, a first request message that includes requested service type data that indicates a type of service requested;
in response to receiving the first request message, determining whether service data stored at the first forwarding node indicates the type of service requested; and
if it is determined that the service data stored at the first forwarding node indicates the type of service requested, then sending a second request message that includes the requested service type only to a recipient node associated with a lowest total cost among all nodes associated with the requested service type in the service data stored at the first forwarding node.

12. A method as recited in claim 11, wherein:
the method further comprises determining whether service data stored at the first forwarding node indicates service property data that indicates particular properties of the type of service requested; and
said step of sending the second request message is performed only if it is determined that service data stored at the first forwarding node does not indicate service property data for the type of service requested.

13. A method as recited in claim 12, further comprising, if it is determined that service data stored at the first forwarding node indicates service property data of the type of service requested, then performing the step of sending a response message that includes the service property data of the type of service requested.

14. A method as recited in claim 11, further comprising, if it is determined that the service data stored at the first forwarding node does not indicate the type of service requested, then sending to every forwarding node in communication with the first forwarding node a query message that includes data that indicates the type of service requested.

15. A method as recited in claim 11, said step of receiving the first request message from the requesting node further comprising receiving a subscription message from a service node that is to consume the type of service requested.

16. A method as recited in claim 15, further comprising, storing notification data that indicates the service node is to be notified when a message is received that includes service type data that indicates the type of service requested.

17. A method as recited in claim 16, further comprising the steps of:
receiving a message that includes service type data that indicates the type of service requested is available; and
based on the notification data, notifying the service node that the service type requested is available.

18. A method as recited in claim 17, wherein:
said step of receiving the message that includes service type data that indicates the type of service requested is available further comprises receiving the message that includes service property data that indicates particular properties of the type of service requested; and
said step of notifying the service node that the service type requested is available further comprising sending to the service node a message that includes service type data that indicates the type of service requested and the service property data that indicates particular properties of the type of service requested.

19. A first apparatus, the first apparatus comprising:
a memory; and
a processor in communication with the memory, the memory including instructions executable with the processor, the instructions comprising:
instructions configured to receive, from a second apparatus in a communications network, a first update message, the first update message including
forwarded service type data that indicates a type of service is available via the second apparatus, and
forwarded cost data that indicates a first cost of communications to reach the type of service via the second apparatus, wherein the type of service includes a dial directory configured to associate a network address with at least one dial number for Internet Protocol telephony;
instructions configured to determine a second cost for communications between the first apparatus and the second apparatus;
instructions configured to store service data that indicates the type of service is available via the second apparatus at a total cost, the total cost being based on the first cost and the second cost; and
instructions configured to send a second update message that includes forwarded cost data based on the total cost.

20. At least one tangible computer-readable media comprising computer executable instructions, wherein the computer executable instructions, when executed by a processor, perform the steps of:
receiving, at a first forwarding node of a communications network from a second forwarding node of the communications network, a first update message that includes
forwarded service type data that indicates a type of service is available via the second forwarding node, and
forwarded cost data that indicates a first cost of communications to reach the type of service via the second forwarding node,
wherein the type of service includes a dial directory that associates a network address with at least one dial number for telephony over Internet Protocol;
determining a second cost for communications between the first forwarding node and the second forwarding node;
storing, at the first forwarding node, service data that indicates the type of service is available via with the second forwarding node at a total cost, the total cost being based on the first cost and the second cost; and
sending a second update message that includes forwarded cost data based on the total cost.

21. A first apparatus, the first apparatus comprising:
a memory; and
a processor in communication with the memory, the memory including instructions executable with the processor, the instructions comprising:
instructions configured to receive, from a second apparatus in a communications network, a first update message, the first update message including
forwarded service type data that indicates a type of service is available via the second apparatus, and
forwarded cost data that indicates a first cost of communications to reach the type of service via the first apparatus,
wherein the type of service is different from data packet routing through the communications network;
instructions configured to determine a second cost for communications between the apparatus and the second apparatus;
instructions configured to store service data that indicates the type of service is available via the second apparatus at a total cost, the total cost being based on the first cost and the second cost;
instructions configured to send a second update message that includes forwarded cost data that is based on the total cost;
instructions configured to determine, in response to a request for the type of service, whether a node in the communications network provides the type of service based on the service data, wherein the request identifies the type of service, not the node.

22. The first apparatus of claim 21, wherein the type of service is a call agent service for telephony using Internet Protocol.

23. The first apparatus of claim 21, wherein the type of service is a security service for processing suspicious data packets received at a node in the communications network.

24. The first apparatus of claim 21, wherein service type data includes:

category data that indicates a category that uniquely identifies a plurality of related services; and
subcategory data that indicates a particular service within the plurality of related services.

25. The first apparatus of claim 21, wherein the first apparatus and the second apparatus are routers, the request for the type of service is from a first call agent, the node in the communications network that provides the type of service is a second call agent, and the type of service is a call agent service.

\* \* \* \* \*